Sept. 22, 1936. H. H. KLEIN Re. 20,115

HAIR CURLER

Original Filed Jan. 7, 1935

INVENTOR.

Harry H. Klein

BY Benjamin Roman

ATTORNEY.

Reissued Sept. 22, 1936

Re. 20,115

UNITED STATES PATENT OFFICE 20,115

HAIR CURLER

Harry H. Klein, New York, N. Y.

Original No. 2,004,760, dated June 11, 1935, Serial No. 713, January 7, 1935. Application for reissue May 7, 1936, Serial No. 79,457

10 Claims. (Cl. 132—41)

This invention relates to hair curlers, and particularly to the type wherein two or more arms are hinged to each other and the hair is curled around and between the arms.

The principal object of the invention is to provide a conveniently utilizable, efficient, and improved hair curling device of the above type.

Another object is to provide a hair curler of the above type, one or more of the arms of which may be rotated about the longitudinal axis of the device relatively to the remaining arms for improving the operation and resulting performance of the hair curler.

A further object is to provide the hair curler with means for retarding the aforesaid rotating action of the arms.

A still further object is to provide a hair curler of the above type with improved means for engaging its hinged arms to each other.

Other objects and advantages will hereinafter appear.

In the accompanying drawing,—

Figure 1:
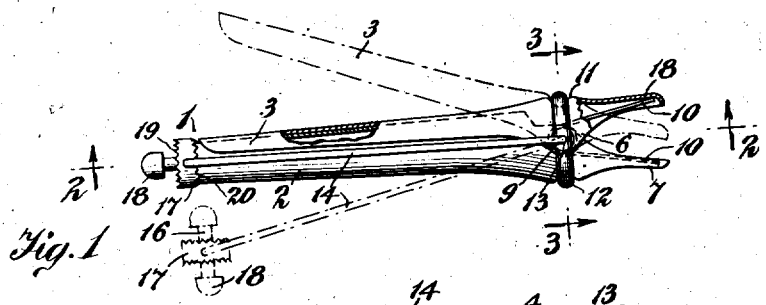
Fig. 1 is a side elevation of the hair curler of this invention.
Figure 2:
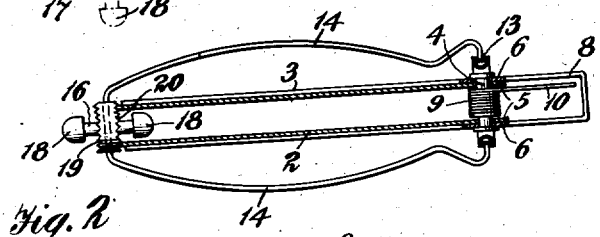
Fig. 2 is a longitudinal cross-sectional plan view of the hair curler shown in Fig. 1.
Figure 3:
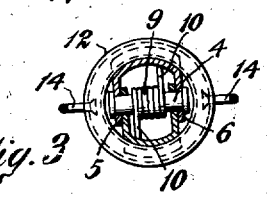
Fig. 3 is a transverse-sectional end elevation of the hair curler shown in Fig. 1.
Figure 4:
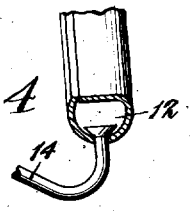
Fig. 4 shows a detail of the hair curler, on an enlarged scale.

The hair curler 1, Fig. 1, has a tubular bar 2 and a concave arm 3, which are hinged to each other by means of a headed axle 4 passing through ears 5, 6 thereof and are provided with respective finger-pieces 7, 8, as illustrated. A spring 9 is wound around the axle 4 and its terminals 10 bear against said finger-pieces, whereby the bar 2 and arm 3 are normally impelled to bear pressingly against each other as shown, while when the finger-pieces 7, 8 are pressed toward each other the arm 3 is swung away from the bar 2 to the position shown by the dash and dot lines, Fig. 1. In the bar 2 and arm 3, over the axle 4, are formed recesses 11 that serve as a mounting for a collar-shaped framing 12, which completely surrounds the hair curler and within which said bar and arm are rotatable. To the framing 12, at 13, is pivoted a hair retaining band 14, about the terminal 15 of which is revolubly mounted a fitting 16, comprising a disk 17 having a knob 18 at each side thereof. The faces of disk 17 have ratchet teeth 19 formed thereon, and the terminal of the bar 2 is provided with cooperating teeth 20, whereby the band 14 may be either swung freely about its pivots 13, as indicated by the dash and dot lines, Fig. 1, or it may be disposed into locked engagement with the bar 2 by grasping one of the knobs 18, inserting the opposite knob into the end of the bar 2, and bringing the ratcheted disk 17 into mesh with the ratchet 20 of said bar. While holding the fitting 16 with one hand and maintaining the band 14 stationary, the bar 2 and arm 3 may be rotated through the framing 12 as a bearing by turning of the finger-pieces 7, 8 about the longitudinal axis of the bar, the meshing teeth 19, 20 permitting this rotation through the springiness of the band 14.

When utilizing the hair curler, the arm 3 is first disposed to the open inoperative position, the end of the hair is then placed between it and the bar 2, then said end is gripped by releasing the arm to the spring-pressed position against the hair and bar 2, the band 14 being in engagement with the bar 2, and, while the knob 18 or band 14 is held with one hand, the finger-pieces 7, 8 are turned with the other and the curling of the hair is thereby continued around the closed arm and bar, until the space between them and the band 14 is snugly filled. The device is then left upon the hair in this condition for a requisite length of time, and it may be then removed by opening up its above parts and sliding off the curled hair therefrom. While the curler is retained in operative state, any tendency of the bar 2 to rotate backwardly, relatively to the stationary arm 14, is retarded by the retention of the meshing teeth 19, 20.

Figure 5:
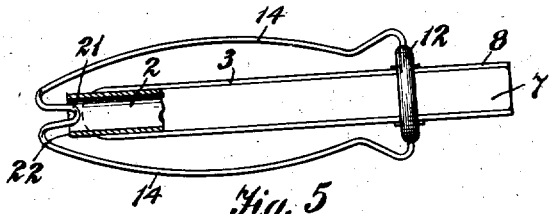
Fig. 5 is a plan view showing a hair curler, which is a modification of the invention.
Figure 6:
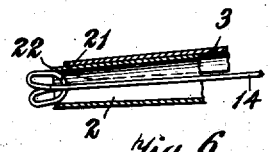
Fig. 6 is a cross-sectional fragmentary view showing a modification of the hair retaining band illustrated in the hair curler of Fig. 5.

In the modification shown in Fig. 5, the band 14 is held to the bar 2 by the former having a loop 21 which enters the bar as shown, when brought pressingly against the rim 22, the springiness of the band 14 permitting this tension of the loop. In Fig. 6 the loop 21 is shown disposed transversely to the plane in which the band 14 lies, to further facilitate its engagement with the bar 2 and retard any tendency of backward rotation of said bar when the curler is in operative state.

Figure 7:
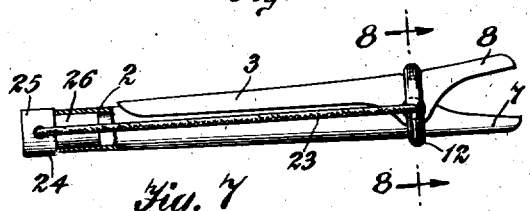
Fig. 7 is a side elevation showing another modification of the invention.
Figure 8:
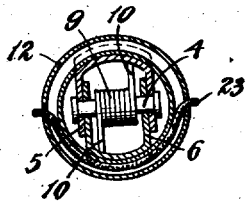
Fig. 8 is a transverse-sectional end elevation of the hair curler shown in Fig. 7.

According to the modification shown in Figs. 7, 8, the hair retaining band is made of elastic material 23 carrying a plug 24 comprising a headed portion 25 and a portion 26 of reduced diameter adapted to enter the terminal of tubular bar 2. In order to apply the band 23 to bar 2, therefore, it merely requires grasping of the plug 24, stretching the elastic band 23, and inserting the plug into engagement with the bar 2, as illustrated.

Variations may be resorted to within the scope of the invention, and portions of the improvements may be used without others.

Having thus described my invention, I claim:—

1. A hair curler having the combination of a hair winding bar, a hair gripping arm hinged to said bar, a hair retaining band, a framing pivoted to said band, and said bar and arm being mounted to rotate within said framing.

2. A hair curler having the combination of a hair winding bar, a hair gripping arm hinged to said bar, a hair retaining band, a framing pivoted to said band, and said bar and arm being mounted at said hinging to rotate within said framing.

3. A hair curler having the combination of a hair winding bar, a hair gripping arm hinged to said bar, a hair retaining band, a framing pivoted to said band, said bar and arm being mounted to rotate within said framing, and means wherewith to hold said band relatively stationary while said bar and arm are being rotated.

4. A hair curler having the combination of a hair winding bar, a hair gripping arm hinged to said bar, a hair retaining band, a framing pivoted to said band, said bar and arm being mounted to rotate within said framing, and said bar and band having ratcheting means to retard the rotation of the bar.

5. A hair curler having the combination of a hair winding bar, a hair gripping arm hinged to said bar, a hair retaining band, a framing pivoted to said band, said bar and arm being mounted to rotate within said framing, and means to retard the rotation of said bar relatively to said band.

6. A hair curler having the combination of a hair winding bar, a hair gripping arm hinged to said bar, an elastic hair retaining band, a framing pivoted to said band, said bar and arm being mounted to rotate within said framing, and said band having a plug adapted to enter and engage said bar for operatively retaining the hair.

7. A hair curler having the combination of a hair winding bar and a hair gripping arm hinged to said bar, a hair retaining band, a framing pivoted to said band, said bar and arm being mounted to rotate within said framing, and ratcheting means to retard the rotation of said bar relatively to said band.

8. A hair curler having the combination of a hair winding bar, a hair retaining band, a framing pivoted to said band, said framing being mounted around said bar at a location between its ends, and said bar being rotatable within said framing.

9. A hair curler having the combination of a hair winding bar, a hair retaining band, a framing joined to said band, said framing being mounted around said bar at a location between its ends, and said bar being rotatable within said framing.

10. A hair curler having the combination of a hair winding bar, a hair gripping arm hinged to said bar, a hair retaining band, a framing joined to said band, said framing being mounted around said bar at a location between its ends, and said bar and arm being rotatable within said framing.

HARRY H. KLEIN.